Figure 1:
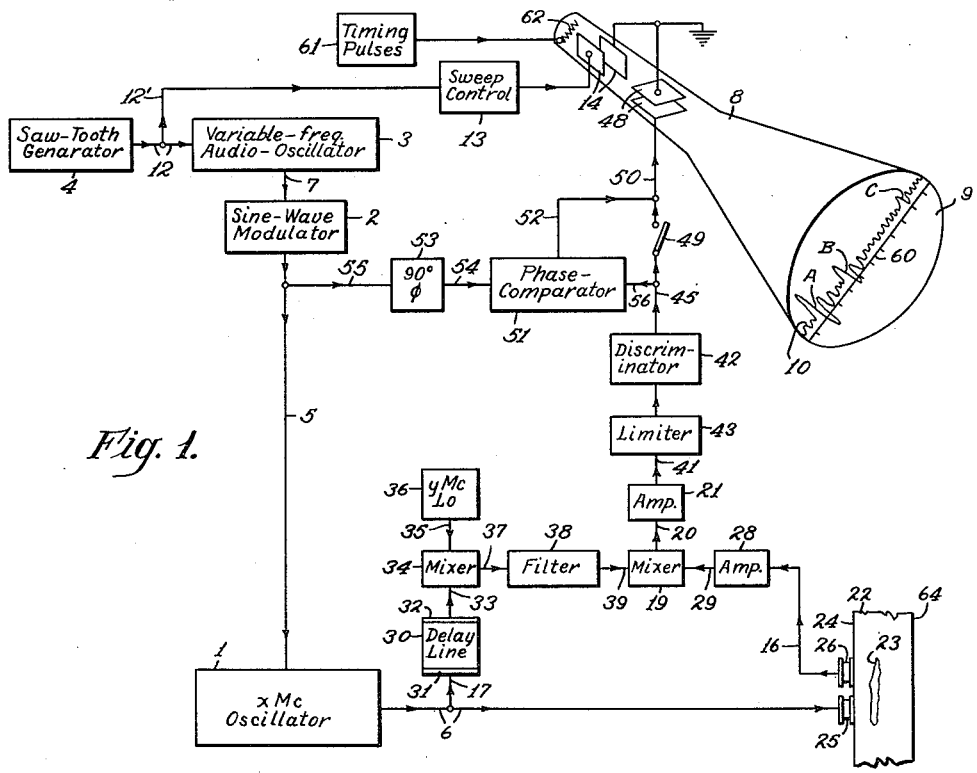

Oct. 30, 1956  M. A. SCHULTZ  2,769,158

DISTANCE-MEASURING ECHO-WAVE DEVICES

Filed March 24, 1948

WITNESSES:
Edward Michaels
Nw. C. Groove

INVENTOR
Mortimer A. Schultz.
BY O. B. Buchanan
ATTORNEY

United States Patent Office 2,769,158
Patented Oct. 30, 1956

2,769,158

DISTANCE-MEASURING ECHO-WAVE DEVICES

Mortimer A. Schultz, Pittsburgh, Pa., assignor to Westinghouse Electric Corporation, East Pittsburgh, Pa., a corporation of Pennsylvania Application March 24, 1948, Serial No. 16,836

24 Claims. (Cl. 340—1)

My invention relates to frequency-modulated continuous-wave distance-measuring echo-wave devices, and it has more particular relation to a frequency-modulated supersonic flaw-detection device.

Heretofore, continuous-wave frequency-modulated wave-comparison distance-measuring echo-wave devices have been known, featuring a delay-line delay inserted in series with one of the waves to be compared, as described and claimed in a Jennings application Serial No. 788,485, filed November 28, 1947, and in a Schultz and Nagel application Serial No. 788,394, filed November 28, 1947, both now abandoned; but these devices were capable, at any one time, of indicating the range or distance of only one deflecting surface, and the mathematical relation between the delay-line delay and the modulation-period had to be adjusted to match the echo-wave distance of that one particular reflecting surface.

Heretofore, various supersonic flaw-detection testing-devices have been known, as shown, for example, in the Firestone Patent 2,280,226, granted April 21, 1942; but various difficulties have been involved therein, including the necessity for transmitting only a single pulse of supersonic energy into the specimen to be tested, thereby limiting the minimum sub-surface depth at which a flaw could be detected in the test-specimen, which depth had to be greater than the pulse-depth, and also involving difficulties in the exact measurement of flaw-depth, and in interpreting the test-results, particularly in the presence of considerable wave-dispersion or wave-attenuation in the test-specimen.

An object of my invention is to provide a distance-measuring echo-wave device using a continuous-wave frequency-modulated transmission, which modulation is being continuously scanned for, or changed to correspond to, all distances within the range of the apparatus, in combination with a cathode-ray oscilloscope, or other wave-analyzing apparatus, which is being correspondingly scanned or changed, so that any reflecting surfaces which produce echo-waves will show up on the analyzer-screen at their appropriate points corresponding to their respective distances, without requiring any adjustment of the apparatus for any particular distance.

A further object of my invention is to provide a device of the class just mentioned, which is responsive solely to the relation between the echo-wave distance, a delay-line time, and the modulation-frequency, regardless of wave-strength or attenuation, thereby admitting of the use of greater amplification factors, with less disturbance from extraneous causes.

Another object of my invention is to utilize a discriminator-means for responding to the frequency-deviations in a resultant mixed wave which is obtained by comparing the echo-wave with a reference-wave which is derived from the transmitted wave, with a delay-means being inserted in series relation to one of the two compared waves; and to provide means for energizing the deflection-plates of an oscilloscope or other wave-analyzer, either directly in response to the output of said discriminator-means, or indirectly through the intervention of a phase-comparator which compares the phase of the frequency-modulations of the generator-wave with the phase of the output of the discriminator-means.

A still further object of my invention is to apply certain broad principles of the distance-measuring or range-finding part of the Jennings application or the Schultz-Nagel application to a supersonic testing apparatus, involving the use of a converting and reconverting means which will convert the electrical generator-wave into a continuous supersonic transmitted wave which is sent into the test-specimen, and is received back again as a supersonic echo-wave coming out of said specimen, and which will again convert said supersonic echo-wave into an electrical echo-wave, which can be examined for echo-distance.

Figure 2:
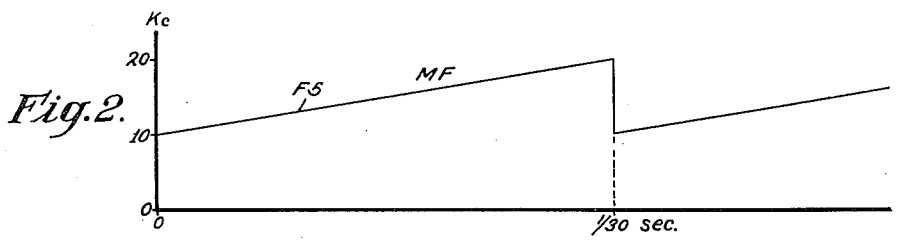
Figure 3:
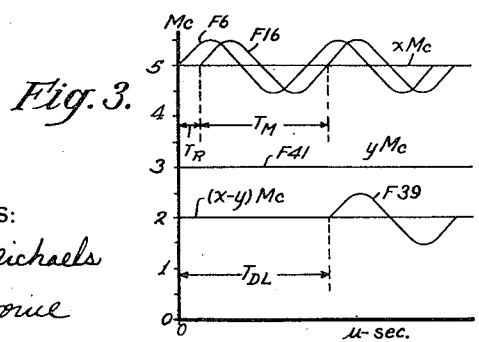

With the foregoing and other objects in view, my invention consists in the systems, circuits, combinations, apparatus, parts, and methods of analysis and operation, hereinafter described and claimed, and illustrated in the accompanying drawing, wherein Figure 1 is a block-diagram, not to scale, which is illustrative of the general principles of one form of embodiment in which my invention may be incorporated, and Figs. 2 and 3 are wave-diagrams which will be referred to in the description.

The primary source of energy for my apparatus is a frequency-modulated generator 1, which may be an oscillator or radar transmitter having a means frequency of $x$ megacycles (mc.), where $x$ may have any suitable value. When the apparatus is used for measuring echo-distances in air, $x$ may vary over a considerable range. When the apparatus is used for the examination of test-specimens, such as solid objects made of steel or other materials, attenuation-difficulties may limit the practical oscillator-frequencies to something like 5 megacycles or less.

The oscillator 1 is a part of a generator-system which also comprises a sine-wave modulator 2, a variable-frequency audio oscillator 3, and a saw-tooth generator 4. The sine-wave modulator 2 is connected to the $x$ mc. oscillator 1 by means of a control-line 5, by means of which it causes a sine-wave frequency-modulation to appear in the output-wave of the $x$ mc. oscillator 1, as produced in the output-line 6 of said oscillator, thus causing the oscillator-output to vary in frequency between $(x+m)$ mc. and $(x-m)$ mc. The magnitude of the sine-wave modulator-frequency deviation $m$ in the $x$ mc. wave can be of the order of ½ mc., or any other suitable value.

The modulation-frequency is determined by the frequency of the variable-frequency audio-oscillator 3, the output of which constitutes the control-line 7 for the sine-wave modulator. The value or range of the modulation-frequency of the audio-oscillator 3 will be a value which is convenient for the measurement of the echo-wave time-delays which are to be measured. A convenient frequency-range for this purpose is something like a range from 10 to 20 kilocycles (kc.). This range should have a ratio less than 2-to-1 between the maximum frequency and the minimum frequency, so that difficulty will not be encountered with respect to distances corresponding to a multiple of the modulation-frequency.

Throughout the operation of the device, the modulation-frequency of the variable-frequency audio-oscillator 3 is being constantly changed over a predetermined range, which, for illustrative purposes, may be considered as a variation between 10 kilocycles and 20 kilocycles, although, in actual practice, a range will be selected having slightly less than a 2-to-1 ratio, for the reasons already explained. The purpose of this modulation-frequency variation is to scan the distance traversed by the transmitted wave (as will be subsequently explained) for the echo-distance or echo-time of a reflecting surface.

My present invention, as will be subsequently explained, uses a cathode-ray oscilloscope or other wave-analyzing device 8 for determining echo-wave distances, by tracing wave-deflections on a fluorescent screen 9. It is desirable that the distance traversed by the transmitted wave, throughout its effective range or other desirable range, shall be scanned by repetitive traces on the oscilloscope-screen 9, each individual trace preferably requiring a scanning time of less than the persistence of vision, which is something of the order of 1/10 of a second. It is desirable for the oscilloscope-trace, such as is shown at 10, to move relatively slowly across the face of the screen 9, and then snap practically instantaneously back to its starting point and begin moving relatively slowly across the face of the screen again, each scanning-movement of the trace requiring less than 1/10 of a second.

Since the scanning of the oscilloscope 8 must be synchronized with the modulation-frequency variation which constitutes the means for scanning the space traversed by the transmitted wave, to find the echo-distance or echo-time, and since the particular form of oscilloscope or wave-analyzer 8 which I have chosen for illustration requires a scanning wave which moves at a preferably uniform rate across the oscilloscope-screen, and then snaps back to its starting point and repeats the operation, within a time-period which is preferably less than 1/10 of a second or the persistence of vision, a saw-tooth generator 4 is required in order to produce such a scanning operation and at the same time to control the modulation-frequency of the variable-frequency audio-oscillator 3. This double control is obtained by utilizing the output-circuit of the saw-tooth generator 4 as the control-circuit 12 of the variable-frequency audio generator 3, and by tapping off a branch-circuit 12' which applies the output of the saw-tooth generator 4 to a sweep-control device 13 which controls the sweep-plates 14 of the oscilloscope 8. The saw-tooth generator 4 thus causes the frequency of the variable-frequency audio-oscillator 3 to vary at a uniform rate from one extreme of its frequency-range to the other, and then to snap back again and start the process all over again, keeping this operation up continuously throughout the operation of the device. A suitable frequency for the saw-tooth generator 4, which has been chosen for illustrative purposes, would be 30 cycles, so that each "saw-tooth" would take 1/30 of a second as indicated in Fig. 2.

While I have indicated the modulation-frequency variation as taking a saw-tooth form, it should be understood, of course, that I am not limited to this particular form of variation of the modulation frequency, so long as the same kind of control is applied both to the scanning-means of the wave-analyzer and to the control-circuit 12 of the variable-frequency audio-oscillator 3.

In carrying out the general purposes of my invention, a transmitted wave is sent out, over a line 6, and an echo-wave is received back, over a line 16. These are both continuous electrical waves which are continuously being sine-wave modulated at an audio-frequency which is being varied, at a relatively slow, 30-cycle rate, between certain limits such as 10 and 20 kilocycles. In using my invention, I also require a third wave, which I refer to as a transmitter-reference wave, which is derived or tapped off, as shown at 17, from the transmitter-output line 6, so that the transmitter-reference wave, as received at 17, and the echo-wave, as received at 16, may be compared or combined (after suitable amplification or modification), in a mixer 19, which produces, in its output-line 20, a mixed wave containing side-bands corresponding to the sum and difference, respectively, of the two input-waves into the mixer 19, and one of these side-bands is then selected, as by means of an amplifier 21 which is tuned to a desired mean frequency.

The manner in which the high-frequency wave is transmitted or sent out, with a small portion of it being reflected back as an echo-wave from a reflecting surface, depends upon the medium in which the reflecting surface is located. If the purpose of the apparatus is to detect or determine the range or distance of a reflecting object or objects in air, an antenna-system is used to transmit the transmitted wave to the reflecting objects and to receive back an echo-wave therefrom, as shown in the Jennings application, and in the Schultz-Nagel application, and in various patents and publications relating to such art, there being several known types of antenna-systems for such a purpose. If the object is to detect a hidden flaw in an object which is opaque to light, or to estimate the sub-surface depth or extent of such a flaw, as is the case in the illustrated form of embodiment of my invention, a crystal-system is used, or other converting and reconverting means, which will convert the electrical generator-wave into a continuous supersonic transmitted wave which is sent into the test-specimen, with provision for receiving a supersonic echo-wave out of said specimen, and reconverting said supersonic echo-wave into an electrical echo-wave. Various means are known for this purpose.

In the drawing, a test-specimen is indicated at 22, having therein a flaw 23 which might be a bubble, hole, crack, surface, or discontinuity, buried somewhere beneath the specimen-surface 24 which is accessible for test-purposes. The converting and reconverting means is usually in the form of one or two crystals, usually of a type cut on the X-axis. While it is possible, with proper precautions, to use the same crystal for transmitting and receiving, I have illustrated the use of a sending-crystal 25, for sending the supersonic transmitted wave into the specimen, and an adjacently located receiving-crystal 26, for receiving the supersonic echo-wave out of the specimen. In each case, one surface or terminal-plate of the crystal is pressed up against the accessible face 24 of the specimen 22, usually with a good supersonic conductor interposed between, such as a film of transformer-oil, while the other surface or terminal-plate of the crystal is electrically connected to the conductor which carries the electrical wave, the transmitting crystal 25 being connected to the transmitted-wave conductor 6, and the receiver-crystal 26 being connected to the echo-wave conductor 16.

The amount of electrical energy which is received in the echo-wave conductor 16 is extremely small, and this energy must be greatly amplified, by any suitable means, which is diagrammatically indicated as an amplifier-means 28, having an output-circuit 29 which constitutes one of the input-circuits of the mixer 19, for supplying one of two comparable waves which are to be combined or mixed in the mixer.

In accordance with my invention, although my invention may not be absolutely limited to such a feature, it is generally desirable to provide some sort of delay-line or delay-means which is so disposed in the apparatus as to cause one of the two comparable waves which are fed into the mixer 19 to be subjected to a predetermined fixed or variable delay-time. Preferably, as shown, this delay-line or means 30 is serially connected in the transmitter-reference circuit 17, although it could have been included in series with the amplified echo-wave line 29, or in series with the receiving-crystal 26, between the test-specimen 22 and said receiving-crystal.

One form of such a delay-line 30 consists essentially of a length of a suitable solid or liquid through which a supersonic wave is passed, thus introducing a delay-time equal to the time required for the passage of the supersonic wave. When such a delay-line 30 is electrically connected in series with an electrical wave, it is furnished with a crystal at each end, as is diagrammatically indicated at 31 and 32, so that the electrical input-wave is converted, by the input-crystal 31, into a supersonic wave, which is reconverted into an electrical wave by the output-crystal 32. In some instances, an all-electrical delay-line or means might be utilized, as distinguished from the supersonic type which has just been described. If the delay-line 30 were placed in the echo-wave system, rather than the transmitter-reference system, it could be interposed between the test-specimen 22 and the receiving-crystal 26, in which case the delay-line crystals 31 and 32 would be omitted.

The magnitude of the delay-line time will be explained hereinafter, in connection with the explanation of the operation of the device.

It may be preferable, in carrying out my invention, although it is not necessary, to utilize some sort of local-oscillator means for heterodyning one or both of said echo-wave and said reference-wave, so that the two comparable waves, which are fed into the mixer 19, have different mean or carrier-frequencies. When such a heterodyning-means is utilized, the amplifier 21 which follows the mixer 19 may be tuned to select the side-band corresponding to the difference between the two mean input-frequencies into the mixer 19. The heterodyning means serves also as an amplifying means, for amplifying the wave which is heterodyned.

In a preferred form of embodiment of my invention, which is illustrated in the drawing, the heterodyning-means is applied to the output-circuit 33 of the delay-line 30 in the transmitter-reference circuit 17. This delay-line output-circuit 33 is thus used as one of the two input-circuits into a heterodyning mixer 34, the other input-circuit 35 of which is fed from a local oscillator (LO) 36 having a frequency, $y$ mc., which is different from the mean or carrier-frequency of the main oscillator 1. The heterodyning mixer 34 has an output-circuit 37 in which there are two side-bands corresponding to the sum and difference, respectively, of the two input-frequencies, and one of these side-bands is selected, usually the side-band corresponding to the difference-frequency, by means of a serially connected filter 38, having an output-circuit 39 which becomes the second input-circuit into the wave-comparing mixer 19, so that said mixer 19 compares the transmitter-reference wave which appears in the circuit 39, with the echo-wave which appears in the circuit 29.

After these two comparable waves are compared in the mixer 19, and after one of the side-bands (usually the difference-frequency) has been selected in the amplifier 21, the output-circuit 41 of said amplifier 21 is fed into a discriminator 42, either directly, or through the intermediary of a limiter 43, which may be advantageously utilized, because my invention is dependent solely upon modulation-frequencies and phases, and is not dependent at all upon the amplitude of the echo-wave, as will be pointed out in the subsequent description of the operation of the invention. The discriminator 42 is a means for responding to the frequency-deviations of the resultant mixed wave in the circuit 41, above and below a predetermined mean frequency which is chosen to be substantially the mean frequency of the mixed wave. The discriminator-response appears as a voltage in the output-circuit 45 of the discriminator 42, this output-voltage being zero when there is no frequency-modulation, that is, no frequency-deviation, in the input-wave into the discriminator. When there is a frequency-deviation in this input-wave, the discriminator output-voltage becomes positive or negative, depending upon whether the frequency-deviation is positive or negative.

In accordance with my invention, the discriminator output-circuit 45 is used, either directly or indirectly, to energize the deflection-plates 48 of the oscilloscope or other wave-analyzer 8. If a direct energization is utilized, a switch 49 is closed, which connects the discriminator output-circuit 45 directly to the deflection-plate control-circuit 50 of the oscilloscope.

In accordance with my invention, it is sometimes advantageous to use some sort of phase-comparator 51, which is interposed between the discriminator output-circuit 45 and the deflection-plate control-circuit 50, in which case the switch 49 would be open. The phase-comparator 51 compares the phase of the output of the discriminator 42 with the phase of the frequency-modulations of the generator-wave, producing an output-voltage, in an output-circuit 52, which varies, in sign and magnitude, in accordance with the phase-variations between the two input-waves, this output-circuit 52 being connected to the deflection-plate control-circuit 50. In the particular apparatus illustrated, the output of the discriminator 42 is phase-shifted 90° with respect to the transmitter-modulation, and hence a 90° phase-shifter 53 is preferably interposed, in either one of the two input-circuits of the phase-comparator 51. In the particular embodiment of my invention which is illustrated in the drawing, the 90° phase-shifter 53 is interposed between the phase-comparator input-circuit 54 and a circuit 55 which is connected to the modulation-frequency control-line 5 of the main oscillator 1. The other input-circuit 56 of the phase-comparator 51 is connected to the discriminator output-circuit 45.

The cathode-ray oscilloscope 8, or other wave-analyzing device, may be provided, if desired, with any convenient calibration-means, which may take the form, either of a suitable scale-marking 60 on the fluorescent screen 9, or of suitable timing-pulses (not shown) which are introduced in a wave-trace on the screen, as by means of a pulsing-apparatus 61 which is connected to a grid 62 of the oscilloscope 8.

In the operation of my invention, it will be perceived that each horizontally displaced point along the wave-trace 10, on the oscilloscope-screen 9, corresponds to one particular modulation-frequency, because the scanning-means of the oscilloscope, which controls the horizontal displacement of the trace on the screen, is controlled by the same means which controls the variation in the modulation-frequency of the main oscillator-wave. The modulation-frequency MF of the oscillator control-circuit 5 is shown by the curve F5 in Fig. 2. The rate of change of the modulation-frequency is very slow, as compared to the modulation-frequency itself, the modulation-frequency being of the order of 10 or 20 kilocycles, while the rate of change of the modulation-frequency is of the order of 30 cycles, so that during any given brief time-interval, which may include a great many cycles at the modulation-frequency, the change in the modulation-frequency in this small time-interval would be negligibly small, so that, at any point on the modulation-frequency wave F5 in Fig. 2, or at any point on the oscilloscope-trace 10 in Fig. 1, it may be considered that a very large number of modulation-frequency cycles occur, at a substantially fixed modulation-frequency.

At any such point, where a large number of modulation-frequency cycles occur at a substantially fixed modulation-frequency, the frequency or envelope of the frequency-modulated carrier-wave or transmitted wave, in the circuit 6, will be as shown by the wave F6 in Fig. 3, where the mean frequency, or carrier-frequency of $x$ mc., is shown as a 5 mc. wave, the frequency of which is sinusoidally varied between a maximum of 5.5 mc. and a minimum of 4.5 mc., these figures being used only for the purposes of illustration.

The frequency or envelope of the echo-wave, which appears in the circuit 16, is shown by the curve F16 in Fig. 3, this curve being displaced from the transmitted-wave curve F6 by a delay-time $T_R$ corresponding to the time required for the reflected wave to pass out to the reflecting surface 23 and to return to the receiving-means or crystal 26.

The time-period of one cycle of the modulation-frequency is indicated at $T_M$ in Fig. 3.

In Fig. 3, the transmitter-reference wave, which appears in the circuit 39, is indicated at F39. This is a wave having a mean frequency of $(x-y)$ mc., and having the same sinusoidal modulation-frequency imposed on it, as in the case of the transmitted-wave F6 and the echo-wave F16. In the drawing, it has been assumed, for the purpose of illustration, that the local heterodyning oscillator 36 has a frequency of 3 mc., so that the delayed and heterodyned transmitter-reference wave F39 has a mean frequency of 2 mc. The delay-time of the time-delay means is indicated at $T_{DL}$ in Fig. 3.

The particular relation between the delay-line time $T_{DL}$ and the modulation-period $T_M$, in Fig. 3, has been chosen so that the sinusoidal modulation in the transmitter-reference wave F39 is exactly in phase with the sinusoidal modulation in the echo-wave F16, so that when these two waves are combined in the mixer 19, the resultant difference-wave, which appears in the circuit 41, is an unmodulated carrier-wave F41 of $y$ mc. Under these particular conditions, the output of the discriminator 42 is zero, because its input-wave has no frequency-deviation from its mean value of $y$ mc. If, however, there had been ever so slight a phase-difference between the two compared sinusoidal waves F16 and F39, the differential wave F41 would have had, in it, a frequency-modulation at the modulation-frequency, and the discriminator 42 would, therefore, show a variation in its output, varying from plus to minus according as the frequency-deviation was initially above or below the mean-frequency of the combined or mixed wave F41, or vice versa.

When such a modulation-frequency wave appears in the output-circuit 45 of the discriminator 42, its phase would be compared, by the phase-comparator 51 (if used), with the phase of the frequency-modulation which is impressed upon the main oscillator 1, so as to determine whether the discriminator-wave is leading or lagging the frequency modulations in the transmitted-wave F6.

The general appearance of the resulting trace 10 on the oscilloscope-screen 9 is depicted qualitatively, not quantitatively, in Fig. 1. At modulation-frequencies which are very slightly displaced, either above or below the modulation-frequency at which the sinusoidal modulations of the echo-wave F16 are in phase with the sinusoidal modulations of the transmitter-reference wave 39 in Fig. 3, the oscilloscope-trace 10, in Fig. 1, will show large voltages, varying rapidly from a maximum positive value to a maximum negative value, with a steep slope, the central point of which represents the modulation-frequency (measured as a horizontal displacement in the trace 10), corresponding to the matched phases of the reference-wave F39 and the echo-wave F16, as indicated by the points A, B and C which are marked on the trace 10 in Fig. 1. This is in general true, whether the switch 49 is open or closed.

Reference to Fig. 3 will show that, at these precise points of phase-coincidence between the sinusoidal modulations of the echo-wave F16 and the sinusoidal modulations of the reference-wave F39, the delay-line time $T_{DL}$ is equal to the sum of the echo- or reflection-time $T_R$ and the time-period $T_M$ of one cycle of the modulation-frequency. Expressed mathematically, $$T_{DL} = T_R + T_M \quad (1)$$

At modulation-frequencies which are materially displaced from the frequency at which the mixed wave F41 is unmodulated, the voltage-output of both the discriminator 42 and the phase-comparator 51 will be considerably smaller, so that the points at which an echo-wave occurs can be readily picked off of the oscilloscope-trace 10, as indicated at A, B and C in Fig. 1, and these distances can be accurately measured.

It will be understood that only a very small part of the transmitted wave is reflected back from each reflecting surface 23, or from the front-surface 24 of the specimen, or from the rear surface 64 of the specimen, so that the appearance of the trace 10, in Fig. 1, will give an intelligible indication of the ranges or distances of all of the reflecting surfaces which send back a portion of the transmitted wave-energy in the form of an echo-wave having a reflection-time $T_R$ which is dependent upon the distance through which the wave travels to and from the reflecting surface.

While I have shown and described the frequency-modulations as being of a sine-wave type, it should be understood that, in a more general sense, the continuous frequency-modulation may have any repetitive wave-shape, not necessarily sinusoidal.

As pointed out in the Jennings application and in the Schultz-Nagel application, the specific relation between the delay-line time $T_{DL}$, the echo- or reflection-time $T_R$, and the modulation-period $T_M$ is useful in a number of respects. The echo- or reflection-time $T_R$ is a function of the velocity of propagation of the wave in the medium through which it travels in going out to the reflecting surface and coming back to the receiver-means (of whatever nature it is), which receives the echo-wave, as symbolized by the receiver-crystal 26 in Fig. 1, merely by way of example. The delay-line time $T_{DL}$ and the modulation-period $T_M$, are values which are subject to control, in the testing apparatus.

I have illustrated by invention in the preferred case in which the delay-line time $T_{DL}$ is fixed, and is included in the reference-wave F39, while the modulation-period $T_M$ is varied to search for the point or points at which the various echo- or reflection-times $T_R$ are matched. Theoretically, however, it is obvious that the modulation-period $T_M$ (and hence the modulation-frequency), could be fixed, while the delay-line time $T_{DL}$ is varied. Likewise, it is obvious that the delay-line time $T_{DL}$ could theoretically be interposed in the echo-wave F16, instead of being interposed in the reference-wave F39, in which case obvious modifications would be made in the wave-diagram of Fig. 3 and in the mathematical relations between the delay-line time $T_{DL}$, the modulation-period $T_M$ and the echo-time $T_R$.

As further pointed out in the Jennings application and in the Schultz-Nagel application, the introduction of the delay-line time $T_{DL}$ provides a means which eliminates any uncertainty as to the range or distance of the reflecting surface. For this purpose, the delay-line time $T_{DL}$ should be approximately commensurate with the range of the apparatus, so that the echo-wave energy which is received from a reflecting surface having a reflection-time or range-delay $T_R$ greater than the delay-line time $T_{DL}$ would be so small as to be negligible or practically indistinguishable from the noise-level. The maximum value of the modulation-period $T_M$ will then be equal to the delay-line time $T_{DL}$ minus the minimum value of the reflection-time or range-delay $T_R$, corresponding to the nearest reflecting-surface distance or range which needs to be responded to by the apparatus. On the other hand, the minimum value of the modulation-period $T_M$ is equal to the delay-line time $T_{DL}$ minus the maximum value of the range-delay $T_R$. If the variable modulation-period $T_M$ is then varied through a range which is less than a 2-to-1 ratio, there will be no uncertainty as to the range or echo-distance of any reflecting surface which shows up on the oscilloscope-trace 10.

Mathematically expressed, these relations yield the inequalities:

$$(T_{DL} - T_{R\,min}) < 2(T_{DL} - T_{R\,max}) \quad (2)$$

$$T_{DL} > T_{R\,max} - T_{R\,min} \quad (3)$$

In the use of my range-testing apparatus or flow-detecting apparatus, no special adjustments are necessary. All that is necessary is to turn the apparatus on, after which the range-searching modulation-frequency modulation will continuously progress, with the points corresponding to different modulation-frequencies appearing as horizontally displaced points on the trace 10 on the oscilloscope-screen. The points where the modulation-frequency $T_M$ corresponds exactly to the difference between the delay-line time and the reflection-time, or $(T_{DL} - T_R)$, will show up on the oscilloscope-screen as some distinctively recognizable points, such as A, B and C in Fig. 1, from which the values of the ranges or echo-distances of all reflecting-surfaces within the range of the apparatus may be properly estimated or interpreted.

While I have specifically illustrated my invention in but a single illustrative form of embodiment, I have indicated, at various points in the description, where certain equivalent circuits and apparatus might be substituted, and I wish it to be understood that the foregoing and other changes may be made, in the way of additions, omissions, and substitutions of equivalents, without departing from the essential spirit of my invention, in its broader aspects. I desire, therefore, that the appended claims shall be accorded the broadest construction consistent with their language.

I claim as my invention:

1. A distance-measuring echo-wave device, comprising a generator-system for providing a continuous, frequency-modulated generator-wave having a continuous frequency-modulation of a repetitive wave-shape, means for sending a continuous transmitted wave from said generator-system to a reflecting surface and for receiving an echo-wave from said reflecting surface, means for deriving a reference-wave from said generator-system, means for deriving two comparable waves from said echo-wave and said reference-wave respectively, a delay-means in series with one of said two comparable waves, means for mixing the two comparable waves and for producing, and selectively responding to, a resultant continuous mixed wave having a frequency corresponding to the sum or difference of the frequencies of the two comparable waves, discriminator-means for responding to the frequency-deviations of the resultant mixed wave above and below its mean frequency, a wave-analyzing apparatus having a deflecting means and a scanning means, means for controlling said deflecting means in series with said discriminator-means, and repetitively varying means for varying either the delay-means delay or the modulation-frequency of the generator-wave between predetermined limits and simultaneously controlling the scanning means of the wave-analyzing apparatus.

2. A distance-measuring echo-wave device, comprising a generator-system for providing a continuous, frequency-modulated generator-wave having a continuous frequency-modulation of a repetitive wave-shape, means for sending a continuous transmitted wave from said generator-system to a reflecting surface and for receiving an echo-wave from said reflecting surface, means for deriving a reference-wave for said generator-system, means for deriving two comparable waves from said echo-wave and said reference-wave respectively, a fixed delay-means in circuit with one of said two comparable waves, means for mixing the two comparable waves and for producing, and selectively responding to, a resultant continuous mixed wave having a frequency corresponding to the sum or difference of the frequencies of the two comparable waves, discriminator-means for responding to the frequency-deviations of the resultant mixed wave above and below its mean frequency, a wave-analyzing apparatus having a deflecting means and a scanning means, means for controlling said deflecting means in series with said discriminator-means, and repetitively varying means for varying the modulation-frequency of the generator-wave between predetermined limits and simultaneously controlling the scanning means of the wave-analyzing apparatus.

3. The invention as defined in claim 1, characterized by the modulation-frequency and the delay-means delay being so related that only one of them needs to be varied, over a range less than 2-to-1, while obtaining a response to distances which may vary over a much greater range than 2-to-1.

4. The invention as defined in claim 1, characterized by local-oscillator means for heterodyning one or both of said echo-wave and said reference-wave so that the two comparable waves have different means frequencies.

5. A distance-measuring echo-wave device, comprising a generator-system for providing a continuous, frequency-modulated generator-wave having a continuous frequency-modulation of a repetitive wave-shape, means for sending a continuous transmitted wave from said generator-system to a reflecting surface and for receiving an echo-wave from said reflecting surface, means for deriving a reference-wave from said generator-system, means for deriving two comparable waves from said echo-wave and said reference-wave respectively, a delay-means in series with one of said two comparable waves, means for mixing the two comparable waves and for producing, and selectively responding to, a resultant continuous mixed wave having a frequency corresponding to the sum or difference of the frequencies of the two comparable waves, discriminator-means for responding to the frequency-deviations of the resultant mixed wave above and below its mean frequency, a phase-comparator means for comparing the phase of the frequency-modulations of the generator-wave with the phase of the output of the discriminator-means, a wave-analyzing apparatus having a deflecting means and a scanning means, means for controlling said deflecting means in response to the output of the phase-comparator means, and repetitively varying means for varying either the delay-means delay or the modulation-frequency of the generator-wave between predetermined limits and simultaneously controlling the scanning means of the wave-analyzing apparatus.

6. A distance-measuring echo-wave device, comprising a generator-system for providing a continuous, frequency-modulated generator-wave having a continuous frequency-modulation of a repetitive wave-shape, means for sending a continuous transmitted wave from said generator-system to a reflecting surface and for receiving an echo-wave from said reflecting surface, means for deriving a reference-wave from said generator-system, means for deriving two comparable waves from said echo-wave and said reference-wave respectively, a fixed delay-means in circuit with one of said two comparable waves, means for mixing the two comparable waves and for producing, and selectively responding to, a resultant continuous mixed wave having a frequency corresponding to the sum or difference of the frequencies of the two comparable waves, discriminator-means for responding to the frequency-deviations of the resultant mixed wave above and below its mean frequency, a phase-comparator means for comparing the phase of the frequency-modulations of the generator-wave with the phase of the output of the discriminator-means, a wave-analyzing apparatus having a deflecting means and a scanning means, means for controlling said deflecting means in response to the output of the phase-comparator means, and repetitively varying means for varying the modulation-frequency of the generator-wave between predetermined limits and simultaneously controlling the scanning means of the wave-analyzing apparatus.

7. The invention as defined in claim 5, characterized by the modulation-frequency and the delay-means delay being so related that only one of them needs to be varied, over a range less than 2-to-1, while obtaining a response to distances which may vary over a much greater range than 2-to-1.

8. The invention as defined in claim 5, characterized by local-oscillator means for heterodyning one or both of said echo-wave and said reference-wave so that the two comparable waves have different mean frequencies.

9. A supersonic testing apparatus comprising: a generator-system for providing a continuous, frequency-modulated electrical generator-wave having a continuous frequency-modulation of a repetitive wave-shape; a converting and reconverting means for converting said electrical generator-wave into a continuous supersonic transmitted wave, sending said supersonic transmitted wave into a specimen to be tested, receiving a supersonic echo-wave out of said specimen, and converting said supersonic echo-wave into an electrical echo-wave; means for deriving an electrical reference-wave from said generator-system; means for deriving two comparable electrical waves from said electrical echo-wave and said electrical reference-wave respectively; means for mixing the two comparable waves and for producing, and selectively responding to, a resultant continuous mixed wave having a frequency corresponding to the sum or difference of the frequencies of the two comparable waves, and discriminator-means for responding to the frequency-deviations of the resultant mixed wave above and below its mean frequency.

10. The invention as defined in claim 9, characterized by a delay means so disposed in the apparatus as to cause one of the two comparable waves to be subjected to a predetermined delay-time, the modulating frequency and the delay-means delay being so related that only one of them needs to be varied, over a range less than 2-to-1, while obtaining a response to distances which may vary over a much greater range than 2-to-1.

11. The invention as defined in claim 9, characterized by local-oscillator means for heterodyning one or both of said echo-wave and said reference-wave so that the two comparable waves have different mean frequencies.

12. The invention as defined in claim 9, characterized by phase-comparator means for comparing the phase of the frequency-modulations of the transmitted wave with the phase of the output of the discriminator-means.

13. A supersonic testing apparatus comprising: a generator-system for providing a continuous, frequency-modulated electrical generator-wave having a continuous frequency-modulation of a repetitive wave-shape; a converting and reconverting means for converting said electrical generator-wave into a continuous supersonic transmitted wave, sending said supersonic transmitted wave into a specimen to be tested, receiving a supersonic echo-wave out of said specimen, and converting said supersonic echo-wave into an electrical echo-wave; means for deriving an electrical reference-wave from said generator-system; means for deriving two comparable electrical waves from said electrical echo-wave and said electrical reference-wave respectively; a delay-means so disposed in the apparatus as to cause one of the two comparable waves to be subjected to a predetermined delay-time; means for mixing the two comparable waves and for producing, and selectively responding to, a resultant continuous mixed wave having a frequency corresponding to the sum or difference of the frequencies of the two comparable waves; discriminator-means for responding to the frequency-deviations of the resultant mixed wave above and below its mean frequency; a wave-analyzing apparatus having a deflecting means and a scanning means; means for controlling said deflecting means in series with said discriminator-means; and repetitively varying means for varying either the delay-means delay or the modulation-frequency of the generator-wave between predetermined limits and simultaneously controlling the scanning means of the wave-analyzing apparatus.

14. A supersonic testing apparatus comprising: a generator-system for providing a continuous, frequency-modulated electrical generator-wave having a continuous frequency-modulation of a repetitive wave-shape; a converting and reconverting means for converting said electrical generator-wave into a continuous supersonic transmitted wave, sending said supersonic transmitted wave into a specimen to be tested, receiving a supersonic echo-wave out of said specimen, and converting said supersonic echo-wave into an electrical echo-wave; means for deriving an electrical reference-wave from said generator-system; a fixed delay-means in circuit with said electrical reference-wave; means for deriving two comparable electrical waves from said electrical echo-wave and said electrical reference-wave respectively; means for mixing the two comparable waves and for producing, and selectively responding to, a resultant continuous mixed wave having a frequency corresponding to the sum or difference of the frequencies of the two comparable waves; discriminator-means for responding to the frequency-deviations of the resultant mixed wave above and below its mean frequency; a wave analyzing apparatus having a deflecting means and a scanning means; means for controlling said deflecting means in series with said discriminator-means; and repetitively varying means for varying the modulation-frequency of the generator-wave between predetermined limits and simultaneously controlling the scanning means of the wave-analyzing apparatus.

15. The invention as defined in claim 13, characterized by the modulation-frequency and the delay-means delay being so related that only one of them needs to be varied, over a range less than 2-to-1, while obtaining a response to distances which may vary over a much greater range than 2-to-1.

16. The invention as defined in claim 13, characterized by local-oscillator means for heterodyning one or both of said echo-wave and said reference-wave so that the two comparable waves have different mean frequencies.

17. A supersonic testing apparatus comprising: a generator-system for providing a continuous, frequency-modulated electrical generator-wave having a continuous frequency-modulation of a repetitive wave-shape; a converting and reconverting means for converting said electrical generator-wave into a continuous supersonic transmitted wave, sending said supersonic transmitted wave into a specimen to be tested, receiving a supersonic echo-wave out of said specimen, and converting said supersonic echo-wave into an electrical echo-wave; means for deriving an electrical reference-wave from said generator-system; means for deriving two comparable electrical waves from said electrical echo-wave and said electrical reference-wave respectively; a delay-means so disposed in the apparatus as to cause one of the two comparable waves to be subjected to a predetermined delay-time; means for mixing the two comparable waves and for producing, and selectively responding to, a resultant continuous mixed wave having a frequency corresponding to the sum or difference of the frequencies of the two comparable waves; discriminator-means for responding to the frequency-deviations of the resultant mixed wave above and below its mean frequency; a phase-comparator means for comparing the phase of the frequency-modulation of the generator-wave with the phase of the output of the discriminator-means; a wave-analyzing apparatus having a deflecting means and a scanning means; means for controlling said deflecting means in response to the output of the phase-comparator means; and repetitively varying means for varying either the delay-means delay or the modulation-frequency of the generator-wave between predetermined limits and simultaneously controlling the scanning means of the wave-analyzing apparatus.

18. A supersonic testing apparatus comprising: a generator-system for providing a continuous, frequency-modulated electrical generator-wave having a continuous frequency-modulation of a repetitive wave-shape; a converting and reconverting means for converting said electrical generator-wave into a continuous supersonic transmitted wave, sending said supersonic transmitted wave into a specimen to be tested, receiving a supersonic echo-wave out of said specimen, and converting said supersonic echo-wave into an electrical echo-wave; means for deriving an electrical reference-wave from said generator-system; a fixed delay-means in circuit with said electrical reference-wave; means for deriving two comparable electrical waves from said electrical echo-wave and said electrical reference-wave respectively; means for mixing the two comparable waves and for producing, and selectively responding to, a resultant continous mixed wave having a frequency corresponding to the sum or difference of the frequencies of the two comparable waves; discriminator-means for responding to the frequency-deviations of the resultant mixed wave above and below its means frequency; a phase-comparator means for comparing the phase of the frequency-modulations of the generator-wave with the phase of the output of the discriminator-means; a wave-analyzing apparatus having a deflecting means and a scanning means; means for controlling said deflecting means in response to the output of the phase-comparator means; and repetitively varying means for varying the modulation-frequency of the generator-wave between predetermined limits and simultaneously controlling the scanning means of the wave-analyzing apparatus.

19. The invention as defined in claim 17, characterized by the modulation-frequency and the delay-means delay being so related that only one of them needs to be varied, over a range less than 2-to-1, while obtaining a response to distance which may vary over a much greater range than 2-to-1.

20. The invention as defined in claim 17, characterized by local-oscillator means for heterodyning one or both of said echo-wave and said reference wave so that the two comparable waves have different mean frequencies.

21. A supersonic testing apparatus comprising: a generator-system for providing a continuous, frequency-modulated electrical generator-wave having a continuous audio-frequency modulation of substantially sine-wave shape; a converting and reconverting means for converting said electrical generator-wave into a continuous supersonic transmitted wave, sending said supersonic transmitted wave into a specimen to be tested, receiving a supersonic echo-wave out of said specimen, and converting said supersonic echo-wave into an electrical echo-wave; means for deriving an electrical reference-wave from said generator-system; a fixed delay-means in circuit with said electrical reference-wave; means for deriving two comparable electrical waves from said electrical echo-wave and said electrical reference-wave respectively; means for mixing the two comparable waves and for producing, and selectively responding to, a resultant continuous mixed wave having a frequency corresponding to the sum or difference of the frequencies of the two comparable waves; discriminator-means for responding to the frequency-deviations of the resultant mixed wave above and below its mean frequency; a wave-analyzing apparatus having a deflecting means and a scanning means; means for controlling said deflecting means in response to the output of said discriminator-means; and means including a saw-tooth generator of relatively lower frequency for relatively slowly varying the modulation-frequency over a predetermined range, rapidly restoring the modulation-frequency to its starting-point, repeating the process, and simultaneously controlling the scanning means of the wave-analyzing apparatus; the modulation-frequency and the delay-means delay being so related that the modulation-frequency needs to be varied over a range less than 2-to-1 while obtaining a response to echo-wave distances which may vary over a much greater range than 2-to-1.

22. The invention as defined in claim 21, characterized by local-oscillator means for heterodyning said reference-wave so that the two comparable waves have different mean frequencies.

23. A supersonic testing apparatus comprising: a generator-system for providing a continuous, frequency-modulated electrical generator-wave having a continuous audio-frequency modulation of substantially sine-wave shape; a converting and reconverting means for converting said electrical generator-wave into a continuous supersonic transmitted wave, sending said supersonic transmitted wave into a specimen to be tested, receiving a supersonic echo-wave out of said specimen, and converting said supersonic echo-wave into an electrical echo-wave; means for deriving an electrical reference-wave from said generator-system; a fixed delay-means in circuit with said electrical reference-wave; means for deriving two comparable electrical waves from said electrical echo-wave and said electrical reference-wave respectively; means for mixing the two comparable waves and for producing, and selectively responding to, a resultant continuous mixed wave having a frequency corresponding to the sum or difference of the frequencies of the two comparable waves; discriminator-means for responding to the frequency-deviations of the resultant mixed wave above and below its mean frequency; a phase-comparator means for comparing the phase of the frequency-modulations of the generator-wave with the phase of the output of the discriminator-means; a wave-analyzing apparatus having a deflecting means and a scanning means; means for controlling said deflecting means in response to the output of said phase-comparator means; and means including a saw-tooth generator of relatively lower frequency for relatively slowly varying the modulation-frequency over a predetermined range, rapidly restoring the modulation-frequency to its starting-point, repeating the process, and simultaneously controlling the scanning means of the wave-analyzing apparatus; the modulation-frequency and the delay-means delay being so related that the modulation-frequency needs to be varied over a range less than 2-to-1 while obtaining a response to echo-wave distances which may vary over a much greater range than 2-to-1.

24. The invention as defined in claim 23, characterized by local-oscillator means for heterodyning said reference-wave so that the two comparable waves have different mean frequencies.

References Cited in the file of this patent

UNITED STATES PATENTS

| | | |
|---|---|---|
| 2,236,893 | Chaffee | Apr. 1, 1941 |
| 2,253,975 | Guanella | Aug. 26, 1941 |
| 2,261,272 | Newhouse | Nov. 4, 1941 |
| 2,422,157 | Wolff | June 10, 1947 |